(12) United States Patent
Brunner et al.

(10) Patent No.: US 7,743,865 B2
(45) Date of Patent: Jun. 29, 2010

(54) METHOD FOR IDENTIFYING AN OBJECT WITHIN A PROTECTIVE ZONE WITH A PROTECTIVE DEVICE FOR A VEHICLE

(75) Inventors: Rolf Brunner, Eichenau (DE); Stefan Mohr, Munich (DE)

(73) Assignee: Leuze Lumiflex GmbH & Co. KG, Fuerstenfeldbruck (DE)

( * ) Notice: Subject to any disclaimer, the term of this patent is extended or adjusted under 35 U.S.C. 154(b) by 511 days.

(21) Appl. No.: 11/599,608

(22) Filed: Nov. 15, 2006

(65) Prior Publication Data
US 2007/0107966 A1 May 17, 2007

(30) Foreign Application Priority Data
Nov. 15, 2005  (DE) .................. 10 2005 054 359

(51) Int. Cl.
*B60T 7/012* (2006.01)
*B60L 3/00* (2006.01)
(52) U.S. Cl. ...................................... 180/167; 180/271
(58) Field of Classification Search ................ 180/271, 180/267; 340/901; 701/23
See application file for complete search history.

(56) References Cited

U.S. PATENT DOCUMENTS

| 4,212,534 A * | 7/1980 | Bodlaj ..................... 356/3.02 |
| 6,347,266 B1 * | 2/2002 | Kageyama ................ 701/25 |
| 2003/0007074 A1 * | 1/2003 | Nagaoka et al. ........... 348/148 |

FOREIGN PATENT DOCUMENTS

| DE | 39 32 344 A1 | 4/1991 |
| DE | 199 15 509 C1 | 6/2000 |

* cited by examiner

*Primary Examiner*—Paul N. Dickson
*Assistant Examiner*—Timothy Wilhelm
(74) *Attorney, Agent, or Firm*—Venable LLP; Robert Kinberg; Leigh D. Thelen

(57) ABSTRACT

Objects within an area of coverage are located at predetermined points in time with an optical sensor. Based on detected locations of the objects, a driving direction and/or a speed of the vehicle is determined as a function of measuring variables measured with the optical sensor. Based on the determined direction and/or speed, (a) a protective zone is selected among a plurality of protective zones previously stored in the optical sensor, or (b) a validity of a preset protective zone or a preset vehicle parameter value stored in the optical sensor is checked.

17 Claims, 2 Drawing Sheets

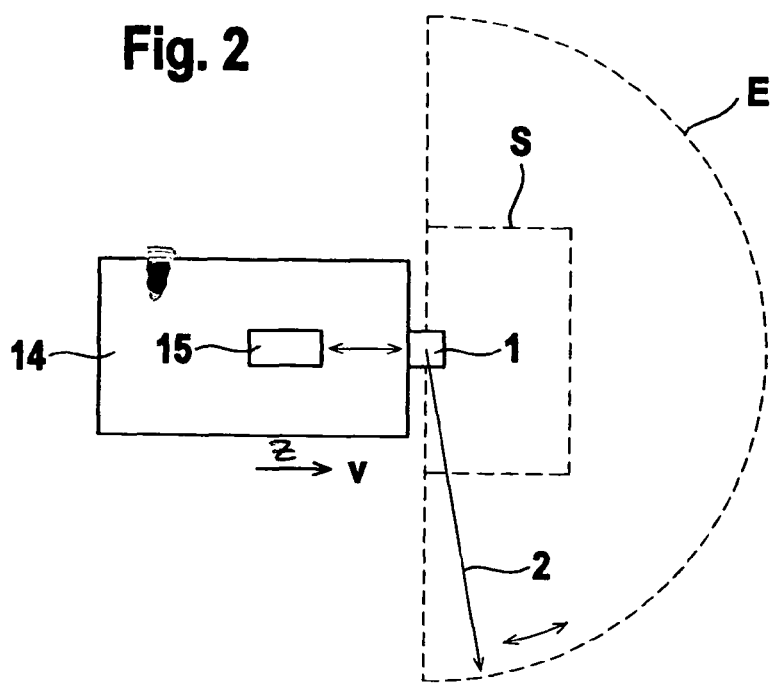
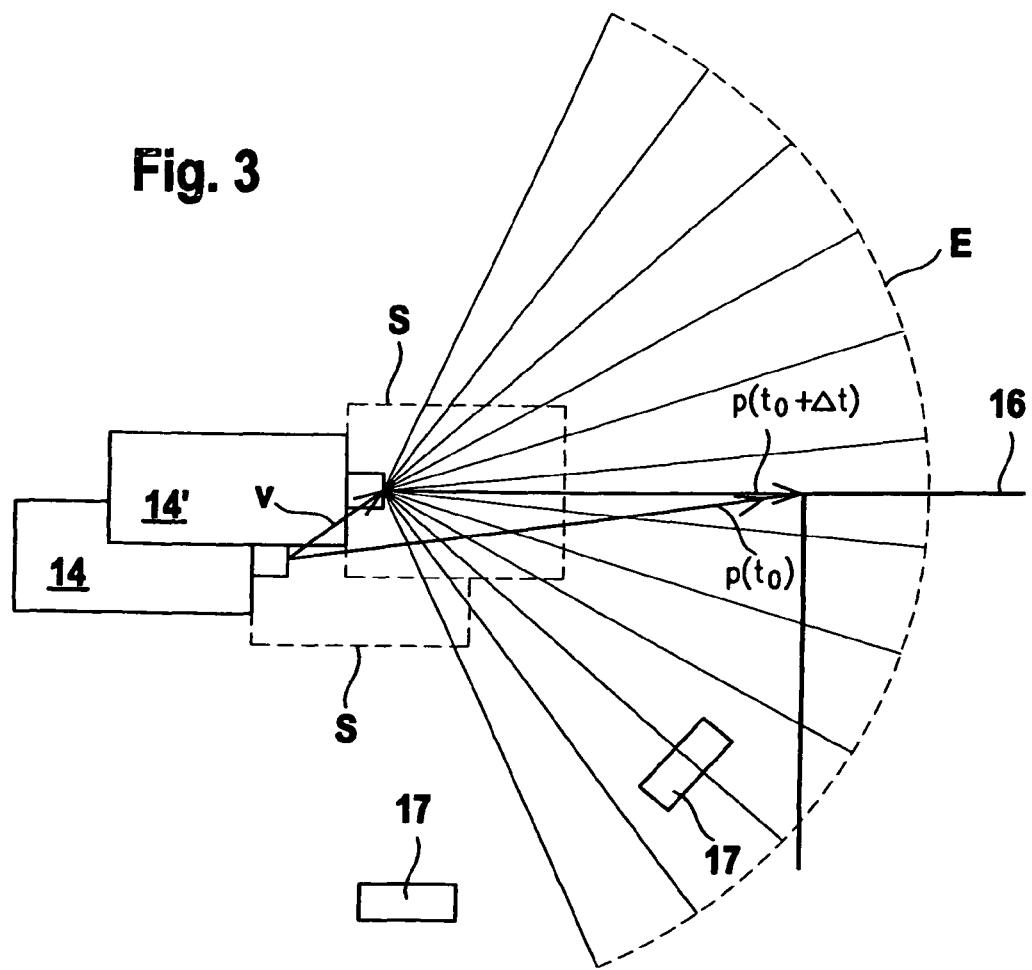

METHOD FOR IDENTIFYING AN OBJECT WITHIN A PROTECTIVE ZONE WITH A PROTECTIVE DEVICE FOR A VEHICLE

CROSS-REFERENCE TO RELATED APPLICATION

This application claims the priority of German Patent Application No. 10 2005 054 359.6-42, filed on Nov. 15, 2005, the subject matter of which is incorporated herein by reference in its entirety.

BACKGROUND

The present invention relates to a method for identifying an object within a protective zone with a protective device for a vehicle, the device comprising an optical sensor installed on the vehicle for locating objects within an area of coverage, wherein at least one protective zone located within the area of coverage is preset in the optical sensor, wherein the optical sensor generates a switching signal if an object is detected in the protective zone.

Protective devices of this type, which operate in a non-contacting manner, are used in particular for the protection of persons. The protective device in question is provided with an optical sensor installed on a vehicle, in particular a driverless transportation system. This protective device is designed to prevent collisions by monitoring the area in front of the vehicle with an optical sensor if the vehicle is in motion. In the process, the optical sensor analyzes whether an object is detected within a protective zone. If the object is detected within a protective zone, the optical sensor generates a shutdown command which stops the vehicle in the protective zone and prevents a collision between the vehicle and the object entering the protective zone, in particular a person.

The problem with systems of this type is that the vehicle, in particular a driverless transport system, moves along predetermined driving routes, for which the surroundings can change constantly. To ensure a secure protection against collision, it is desirable to change the dimensions of the protective zone, such that the protective zone corresponds to the surrounding conditions and the speed of the vehicle. For example, if the vehicle travels at a high speed, the protective zone might have a larger size because of a correspondingly long braking distance for the vehicle, so that the vehicle can be stopped in a timely manner once an object is detected in the protective zone for the vehicle and before a collision occurs. In contrast, if the vehicle is driving through a curve that is bordered by a wall or the like, the protective zone might have a smaller size, so that the wall is located outside of the protective zone. Otherwise, the detection of the wall within the protective zone would trigger an unnecessary emergency stop of the vehicle.

Known optical sensors cannot meet the requirement of adapting the protective zone, especially if the dimensions for a protective zone are fixedly preset in the optical sensor. German patent document DE 39 32 344 A1, for example, discloses an optical sensor of this type.

German patent document DE 199 15 509 A1 discloses an optical sensor embodied as a distance sensor for an area, which is provided with an evaluation unit capable of storing several protective zones. The protective zones can be selected and activated individually by means of several switches, so that the selected protective zone can be monitored to detect persons or objects entering this zone.

SUMMARY

It is an object of the present invention to provide a method for locating an object within a protective zone with a protective device of the aforementioned type, which method and device ensure a secure monitoring of the area surrounding a vehicle, even if the surrounding conditions change over time.

The above and other objects are accomplished according to the invention by the provision of a method for locating an object within an area of coverage with a protective device for a vehicle, wherein the protective device comprises an optical sensor installed on the vehicle and wherein the area of coverage includes a protective zone, within which object detection is realized, the method comprising: (a) locating objects within the area of coverage at predetermined points in time with the optical sensor; (b) based on detected locations of the objects, determining at least one of a driving direction or a speed of the vehicle as a function of measuring variables measured with the optical sensor; and (c) based on the determined driving direction and/or speed, one of: selecting a protective zone with the optical sensor among a plurality of protective zones previously stored in the optical sensor, or checking, with the optical sensor, at least one of a validity of a preset protective zone or a preset vehicle parameter value stored in the optical sensor.

In accordance with one embodiment, the optical sensor for the protective device not only detects objects within a protective zone to prevent a collision while the vehicle is in motion, but also determines the direction and speed of the vehicle by a continuous detection of the area surrounding the vehicle. Thus, a current protective zone which is optimally adapted to the surrounding conditions can be selected and activated based on the measuring variables. The protection against collision for the vehicle is therefore realized with a protective zone that is adapted to the surrounding conditions and vehicle parameters.

One advantage of the protective method and device according to another embodiment is that no external sensors or the like are required for selecting the current protective zone, within which the object is detected, in order to realize a collision protection for the vehicle. Rather, the criteria for selecting the current protective zone are generated in the optical sensor itself. It is furthermore advantageous that no involved preparation of the surrounding area is necessary for determining the driving direction or speed of the vehicle and that a continuous determination of the absolute vehicle location is also not required. On the contrary, only a continuous scanning of stationary objects with the optical sensor is necessary to determine the relevant measuring variables. With this continuous scanning, it is possible to determine the chronological course of the displacement vector for the vehicle relative to these objects, which can then be used to determine the driving direction and speed of the vehicle. It is particularly advantageous that the protective device can distinguish between stationary objects and moving objects, so that only stationary objects are used for the further evaluation to determine the vehicle driving direction and speed.

In accordance with yet another embodiment, the assignments of the individual protective zones to preset driving directions and speeds of the vehicle during the operating phase that follows the start-up phase are entered and stored in the optical sensor prior to the activation of the protective device.

According to yet another embodiment, the current vehicle protective zone for the collision monitoring is then selected during the operating phase of the protective device from among the protective zones stored in the optical sensor, based on the currently determined driving direction and/or speed.

According to a further embodiment, the vehicle control unit presets the current protective zone in which the optical sensor monitors the collision danger. The optical sensor uses the values input prior to the start-up of operations to determine whether a valid protective zone was input by the control unit and generates a shutdown command for the vehicle, in the form of a switching signal if no valid protective zone exists. According yet to a further embodiment, a check is performed by the optical sensor of the validity of vehicle parameters which are input alternatively or additionally by the control unit, such as stops or the maximum speed of the vehicle.

According to yet further embodiment, during the monitoring of the collision danger, the optical sensor generates a switching signal, in particular in the form of a shut-down command for the vehicle, if an object is detected in the current protective zone.

According to yet a further embodiment, the collision monitoring can generally be expanded to include not only a detection of objects in the current protective zone by the optical sensor, wherein the protective zone advantageously covers the area directly in front of the vehicle, but to also a monitoring of a warning zone which extends past the protective zone and covers longer distances. If the optical sensor detects an object inside such a warning zone, the optical sensor does not generate a shut-down command for the vehicle but an alarm signal in the form of an acoustic or optical warning. If a person enters the warning zone, the person is warned by the alarm signal and has time to leave the area in front of the vehicle before entering the protective zone, thereby triggering an emergency stop of the vehicle. The warning zones can be selected and activated together with the respective protective zone.

According to yet a further embodiment, the optical sensor can be provided with a camera functioning as receiving unit, which is embodied as a distance measuring system. A lighting unit is assigned to this camera. Alternatively, a transmitter can be assigned to the camera, wherein the light rays emitted by the transmitter are periodically deflected by a deflection unit in order to generate a scanning pattern.

According to yet a further embodiment, the optical sensor can be embodied as a scanning distance sensor for area.

According to yet another embodiment, the optical sensor includes an evaluation unit with redundant configuration for the signal evaluation, so that the optical sensor meets the safety requirements when used for the protection of persons. In particular, the evaluation unit can have a redundant, two-channel design with two microprocessors that monitor each other mutually.

BRIEF DESCRIPTION OF THE DRAWINGS

These and other features and advantages of the invention will be further understood from the following detailed description of the exemplary embodiments with reference to the accompanying drawings, which show in:

FIG. 2: A schematic representation of a vehicle that is provided with an optical sensor as shown in FIG. 1, which operates as non-contacting protective device; and FIG. 3: A schematic representation of the vehicle shown in FIG. 2, at two successive points in time where the vehicle passes by stationary objects.

DETAILED DESCRIPTION OF THE PREFERRED EMBODIMENTS

Figure 1:
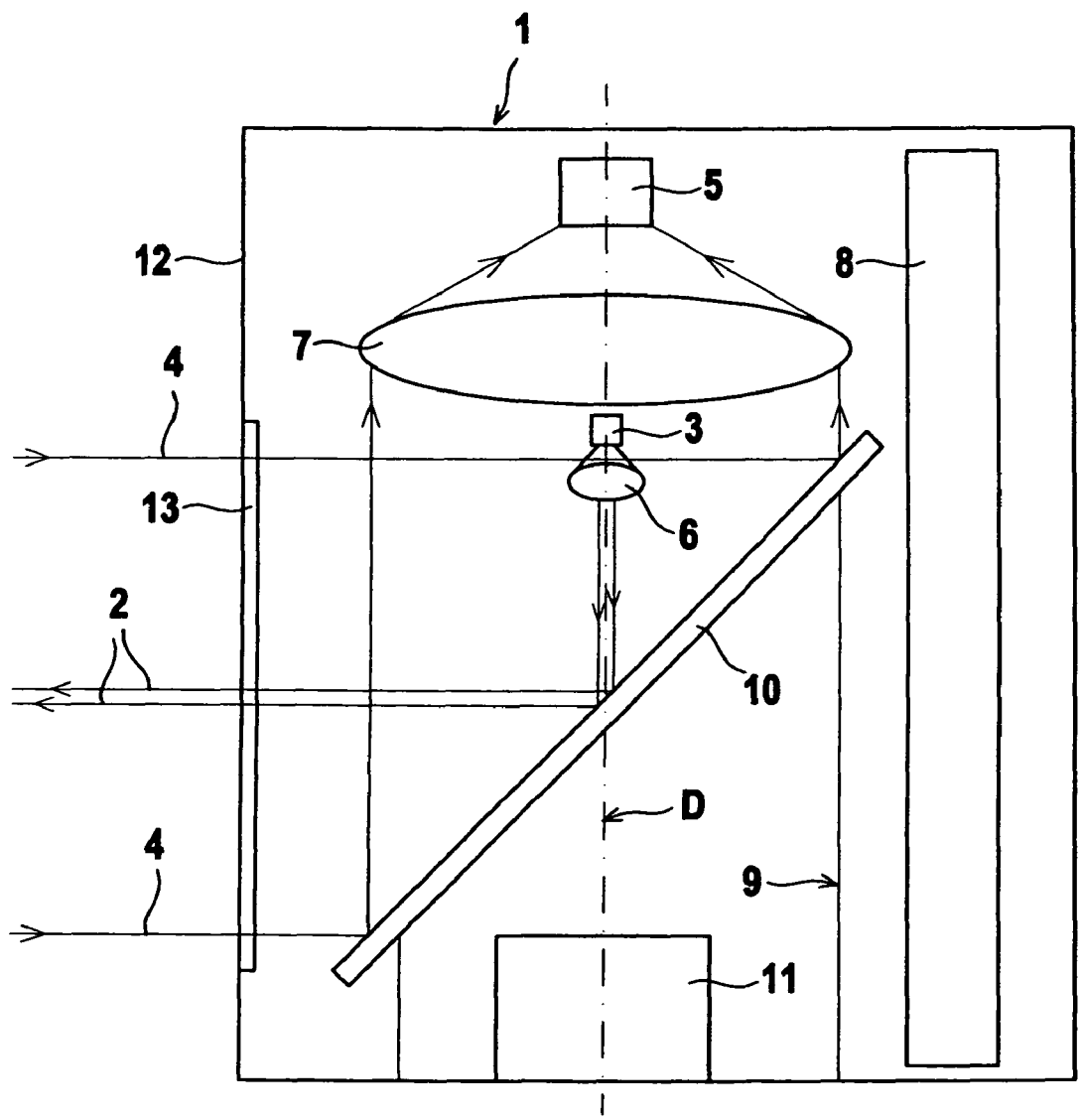
FIG. 1: An exemplary embodiment of an optical sensor.

FIG. 1 shows an optical sensor 1 in the form of a distance sensor for an area. The distance sensor for the optical sensor 1 comprises a transmitter 3 for emitting light rays 2 and a receiver 5 for receiving light rays 4. The transmitter 3 preferably is a laser diode with a downstream installed transmitting optics 6, designed to form a beam with the transmitted light rays 2. The receiver 5 is a pin-photodiode, for example, or an especially preferred avalanche photodiode with an upstream installed receiving optics 7.

The phase-measuring principle can be used for the distance measuring. In that case, the laser diode is operated in the CW [continuous wave] mode, wherein an amplitude modulation is imprinted on the transmitted light rays 2. On the receiving side, the distance information is determined by comparing the phase positions of the transmitted light rays 2 to those of the received light rays 4, which are reflected back by an object and impinge on the receiver 5. The evaluation takes place in an evaluation unit 8, to which the transmitter 3 and the receiver 5 are connected via feed lines that are not shown herein.

Alternatively, the pulse transit-time method can be used for measuring the distance. With this method, short transmitting light pulses are emitted by the transmitter 3 and the distance information is obtained by directly measuring the time needed for a transmitted light pulse to travel to an object and then back to the receiver 5.

The transmitted light rays 2 and the received light rays 4 are guided across a deflection unit 9. The deflection unit 9 is provided with a deflection mirror 10 that is mounted on a rotating holder and is driven with a motor 11. The deflection mirror 10 rotates with a predetermined speed around a vertical axis of rotation D. The optical sensor 1 is integrated into a housing 12 that is provided with an exit window 13 in a front wall for guiding the transmitted light rays 2 and the received light rays 4. To detect the position of the objects, the current angle position of the deflection unit 9 is detected continuously by an angle transmitter, not shown herein, which is connected to the evaluation unit 8. The evaluation unit 8 determines the position of an object from the angle position and the distance value recorded at this angle position.

In the embodiment of FIG. 2, the vehicle 14 is a driverless transport system. Driverless transport systems of this type are used for transporting loads along predetermined driving routes inside factory halls and the like. The arrow Z in FIG. 2 indicates the driving direction of the driverless transport system 14 while the reference v denotes the speed. A control unit 15 in this case controls the driverless transport system 14. Because the transport system 14 is driven without a driver along the movement path, an automatic collision monitoring is required. To realize a collision monitoring of this type, the optical sensor 1 which functions as non-contacting protective device is installed on the front of the driverless transport system 14 and is connected to the control unit 15.

As illustrated in FIG. 2, the light rays 2 transmitted by the optical sensor 1 are periodically swept across a half plane, which forms an area of coverage E, within which the optical sensor 1 can detect and locate objects. The horizontally extending area of coverage E directly adjoins the front of the driverless transport system 14 and covers the area directly in front of the driverless transport system 14.

For the collision monitoring, the optical sensor 1 monitors a protective zone S to detect objects entering the protective zone S. The protective zone S forms a section within the area of coverage E that is monitored by the optical sensor 1. The protective zone S shown in FIG. 2 has a rectangular outline and its width is adapted to the width of the driverless transport system 14.

Once the optical sensor 1 detects an object and/or a person inside the protective zone S, a switching signal is generated in the optical sensor 1. The switching signal takes the form of a shutdown command for the driverless transport system 14, which is read into the control unit 15 of the driverless transport system 14. The shut-down command is used to stop the driverless transport system 14. The protective zone S is dimensioned such that when an object or a person enters the protective zone S, the driverless transport system 14 is shut down in time to prevent a collision with the person or object by generating a shutdown command.

For the transport operations, the driverless transport system 14 is guided with a predetermined speed profile along a predetermined driving route. To ensure an optimum collision protection, the geometry and size of the protective zone S is adapted to the changing conditions of the surrounding area.

The protective zone S is automatically adapted or checked by the optical sensor 1. To execute this control function, the control unit 15 enters the dynamic behavior of the driverless transport system 14 in the form of learned-in parameters into the optical sensor 1 prior to the activation of the protective zone S and before the start of the movement of the driverless transport system 14. In the process, the speed profile for the driverless transport system 14, its stoppages, and its maximum speed are entered in the form of input variables into the optical sensor 1. The respective applicable protective zones are assigned to these parameters and are also read into the optical sensor 1.

During the operating phase that follows the teach-in phase, the optical sensor 1 continuously determines the current driving direction and speed of the driverless transport system 14. FIG. 3 schematically illustrates the functional principle used for determining these data. The reference number 14 in FIG. 3 refers to the vehicle, in the form of the driverless transport system 14, which is shown at a point in time $t=t_o$. The same vehicle is furthermore shown in FIG. 3 at a later point in time $t=t_o+\Delta t$ and is denoted by the reference number 14'. At each of these points in time, the optical sensor 1 carries out a collision monitoring within the protective zone S. At the same time, the optical sensor 1 determines the driving direction and the speed of the driverless transport system 14, 14' by continuously recording stationary objects which are located outside of the protective zone S, but still within the area of coverage E.

As shown in FIG. 3, an object of this type is a wall 16 toward which the driverless transport system 14 moves. Other stationary objects can be reflectors 17 that serve as markers for marking the boundary of the driving route for the driverless transport system 14, in the area in front of the wall 16. The positions of these stationary objects are detected continuously by the optical sensor 1 to determine the speed and the driving direction of the driverless transport system 14.

As illustrated in FIG. 3, the edge of the wall 16 is being detected. At a point in time $t=t_o$, the driverless transport system 14 is still positioned in front of the wall 16. At this point in time, the optical sensor records a position $p(t_o)$ of the edge of the wall 16 relative to the optical sensor 1. At point in time $t=t_o+\Delta t$, the driverless transport system 14 is moved forward and to the side, so as to drive around the wall 16, wherein the optical sensor 1 at this point in time records a position $p(t_o+\Delta t)$.

By forming the difference $$R=p(t_o+\Delta t)-p(t)$$

the driving direction of the driverless transport system 14 is determined in the optical sensor 1. By forming the quotient $$v=(p(t_o+\Delta t)-p(t_o))/\Delta t,$$

the speed of the driverless transport system 14 is determined by the optical sensor 1.

In general, the driving direction and the speed of the driverless transport system 14 are determined by continuously determining the positions of stationary objects outside of the protective zone S.

According to one embodiment, the currently applicable protective zone S, in which the collision monitoring is realized by the optical sensor 1, is selected from among a number of protective zones previously stored in the optical sensor 1 and based at least on one of the determined driving direction and speed.

As shown in FIG. 3, the size of the protective zone S is smaller than the distance between the optical sensor 1 and the wall 16. For that reason, the same protective zone S remains activated at point in time $t=t_o+\Delta t$ and at point in time $t=t_o$. However, as soon as the driverless transport system 14 moves closer to the wall 16, the speed of the driverless transport system 14 due to the detection of the edge of the wall 16 by the optical sensor 1. A smaller protective zone is selected automatically to ensure that the wall 16 is located outside of the current protective zone S when the driverless transport system 14 passes the wall 16.

Because the vehicle speeds and direction along with the protective zones were stored and assigned to the driving directions and speeds that correspond to the speed profile, the respective applicable protective zone S is selected by the optical sensor based the currently recorded driving direction and speed and by comparing the currently recorded driving direction and speed to the previously entered input values for driving direction and speed.

The optical sensor 1 of further embodiment is separate from the control unit 15, wherein the currently applicable protective zones are selected solely by the optical sensor 1. The collision monitoring also takes place only by the optical sensor 1. The optical sensor 1 only transmits the output variable for the switching signal to the control unit 15, so that the driverless transport system 14 can be stopped if an object is detected within the protective zone S.

According to another embodiment, the control unit 15 presets the applicable protective zones for the optical sensor 1, so that the control unit 15 takes over the operation of the non-contacting protective device. By comparing the actually determined values for the driving direction and speed to the previously stored input values, the optical sensor 1 executes a check of the validity of the learned-in protective zones. If the optical sensor 1 identifies the protective zone as valid, the protective zone is released in the optical sensor 1. Objects entering the protective zone S can be monitored by the optical sensor 1. If the optical sensor 1 identifies the protective zone as non-valid, a shut-down command is generated by the optical sensor which triggers an emergency stop of the driverless transport system 14.

The evaluation can be expanded further to include a check by the optical sensor 1 of the stoppages and maximum speeds of the driverless transport system 14, which are present by the control unit 15.

It will be understood that the above description of the present invention is susceptible to various modifications, changes and adaptations, and the same are intended to be comprehended within the meaning and range of equivalents of the appended claims.

What is claimed is:

1. A method for identifying an object within a protective zone with a protective device for a vehicle, wherein the protective device comprises an optical sensor installed on the vehicle and wherein an area of coverage monitored by the optical sensor includes a protective zone, within which object detection is realized, the method comprising:
    (a) locating objects within the area of coverage at predetermined points in time with the optical sensor;
    (b) based on detected locations of the objects, determining at least one of a driving direction or a speed of the vehicle;
    (c) based on the determined driving direction and/or speed:
        selecting a protective zone with the optical sensor among a plurality of protective zones previously stored in the optical sensor, wherein the protective zone forms a section within the area of coverage monitored by the optical sensor, or
        checking, with the optical sensor, at least one of a validity of a preset protective zone or a preset vehicle parameter value read into the optical sensor by a vehicle control unit;
    (d) monitoring the protective zone with the optical sensor for detection of an object;
    (e) generating a switching signal in the optical sensor if:
        an object is detected in the protective zone, or
        at least one of the preset protective zone or the preset vehicle parameter value read in by the vehicle control unit is identified as non-valid by the optical sensor in the checking step;
    (f) evaluating the switching signal via a redundant evaluation unit associated with the optical sensor, wherein the redundant evaluation unit satisfies safety requirement standards for the protection of persons;
    (g) forwarding the switching signal from the optical sensor to the vehicle control unit, wherein the switching signal comprises a shutdown command;
    (h) receiving the shutdown command by the vehicle control unit; and
    (i) stopping the vehicle with the vehicle control unit.

2. The method according to claim 1, further including:
    prior to performing steps (a) through (c), storing into the optical sensor predetermined driving directions and speeds of the vehicle, the protective zones and input variables associated therewith.

3. The method according to claim 2, further including:
    presetting maximum speed and stoppages of the vehicle as the vehicle parameters values in the optical sensor.

4. The method according to claim 1, further including:
    assigning at least one warning zone for the protective zone;
    monitoring the warning zone with the optical sensor;
    detecting an object in the monitored warning zone; and
    generating an alarm signal upon detection of the object in the monitored warning zone.

5. The method according to claim 4, wherein the protective zone includes an area directly in front of the vehicle and the warning zone adjoins the protective zone and extends outward for longer distance than the distance the protective zone extends from the vehicle.

6. The method according to claim 4, further including one of:
    in said selecting step, selecting a previously stored warning zone assigned to the protective zone in the optical sensor, or
    providing the protective zone and an associated warning zone to the optical sensor.

7. The method according to claim 1, wherein the step of locating objects includes locating stationary objects with the optical sensor and further including:
    determining at least one of the driving direction and speed based on the determined locations of the stationary objects.

8. The method according to claim 7, wherein the stationary objects include markings.

9. The method according to claim 7, wherein the step of locating objects further includes:
    distinguishing between stationary objects and moving objects.

10. The method according to one of the claim 1, wherein the locating step includes using a camera as the optical sensor.

11. The method according to claim 10, wherein the locating step includes using a lighting unit that is assigned to the camera.

12. The method according to claim 11, wherein the locating step includes emitting light rays with a transmitter, assigned to the camera and deflecting the rays emitted by the transmitter with a deflector.

13. The method according to claim 1, wherein the locating step includes using a scanning distance sensor as the optical sensor.

14. The method according to claim 13, wherein the scanning distance sensor comprises:
    a transmitter for emitting light rays;
    a receiver for receiving light rays;
    a deflecting unit for deflecting the transmitted light rays, the deflected transmitted light rays periodically sweeping across the area of coverage.

15. The method according to claim 14, wherein the area of coverage is located in a single plane.

16. The method according to claim 1, further including:
    controlling the vehicle with the vehicle control unit.

17. The method according to claim 1, wherein the vehicle includes a driverless transport system.

* * * * *